United States Patent [19]

Nielsen et al.

[11] 4,239,109
[45] Dec. 16, 1980

[54] STORAGE BOX FOR SUBSTANTIALLY PARALLELEPIPEDIC TAPE AND FILM CASES

[76] Inventors: Don B. Nielsen, Vintergatan, S-502 60 Borås; Knut J. Nielsen, Björkebacken, S-513 02 Borgstena, both of Sweden

[21] Appl. No.: 6,752

[22] Filed: Jan. 26, 1979

[51] Int. Cl.³ .......................................... B65D 85/672
[52] U.S. Cl. .................................... 206/387; 312/13; 221/87
[58] Field of Search .................. 206/387; 312/13, 245, 312/319; 221/87

[56] References Cited

U.S. PATENT DOCUMENTS

| | | | |
|---|---|---|---|
| 3,811,745 | 5/1974 | Cylke | 206/387 |
| 3,995,921 | 12/1976 | Ackeret | 206/387 |

FOREIGN PATENT DOCUMENTS

| | | | |
|---|---|---|---|
| 2236661 | 2/1974 | Fed. Rep. of Germany | 206/387 |
| 2433570 | 1/1976 | Fed. Rep. of Germany | 206/387 |
| 2317184 | 11/1977 | Fed. Rep. of Germany | 206/387 |

*Primary Examiner*—Joseph Man-Fu Moy
*Attorney, Agent, or Firm*—Finnegan, Henderson, Farabow, Garrett & Dunner

[57] ABSTRACT

A storage box for substantially parallelepipedic tape and film cartridges, and cases for such cartridges, comprises side walls, a back wall, and a front wall of substantially lower height than the back wall. A top wall extends from the back wall a short distance inwardly over the bottom wall spaced therefrom. Spring elements are provided on the bottom wall for pressing cartridges or cases stored in the box, individually towards the lower side of the top wall and towards the inner sides of the front and back walls.

6 Claims, 4 Drawing Figures

STORAGE BOX FOR SUBSTANTIALLY PARALLELEPIPEDIC TAPE AND FILM CASES

This invention relates to a storage box for substantially parallelepipedic tape and film cases and more particularly to a storage box intended to be used in motor cars for storing such tape cartridges as are used in tape players, and cases receiving such cartridges.

The term "case" as used herein includes the tape or film cartridge itself as well as a case receiving the cartridge.

The Finnish Pat. No. 49,653 describes a storage box wherein the cases are slid into position between a bottom wall and a top wall from an open side of the storage box, a low abutment being provided at the open side in order to prevent the case, when positioned in the storage box, from being unintentionally displaced from said position. In this storage box the cases are positioned loosely and it cannot be avoided that a noise is produced due to shaking and vibration of the cases when positioned in the storage box, particularly when the storage box is used in a motor car.

According to the Swedish Pat. No. 361,541, there is provided in a similar storage box for a spring element which keeps the case in the intended position in the storage box. However, when a case is to be positioned in this storage box it is necessary to insert it from one side of the box and to place it in the intended position by a pivoting movement about an abutment formed at the insert opening of the box, which makes the use of this storage box rather difficult and cumbersome.

The Swedish laid-open Pat. application No. 7504963-5 describes a storage box wherein the case is engaged from above with a spring element mounted on the bottom of the storage box, the case being locked in a position wherein the spring element is depressed, by means of a resilient latch. It is essential when using this storage box that the case is moved vertically into the box, and when the case shall be removed from the storage box it is necessary to manipulate the resilient latch. Thus, also in this case the use of the storage box is rather difficult and cumbersome.

It is a primary object of this invention to provide a new and improved storage box of the type referred to above, which securely retains the cases in the intended position in the storage box and eliminates the risk of the cases being displaced from their intended position due to shock and vibration as can occur when the storage box is used in a motor car.

It is a further object of this invention to provide a new and improved storage box of the type referred to above wherein the cases can be stored in a well-organized manner so that the cases can be easily inserted into the storage box and removed therefrom, which is particularly essential when the storage box is used in a motor car where these operations must be performed without disturbing the driver.

A still further object of this invention is to provide a new and improved storage box of the type referred to above which can be mounted easily in a motor car and can be connected to and disconnected from other identical storage boxes.

Yet another object of this invention is to provide a new and improved storage box of the type referred to above which combines several and preferably all of the objects recited above.

Additional objects and advantages of the invention in part will be set forth in the description which follows and in part will be obvious from the description or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, a storage box for substantially parallel-epipedic tape and film cartridges or cases comprises first and second pairs of opposite parallel side walls, a bottom wall, a top wall spaced from the bottom wall and extending inwardly a short distance from one of the walls of said first pair perpendicularly to said one wall, said bottom wall and said top wall being arranged to receive the case therebetween, the other wall of said first pair having a height from the bottom wall which is substantially half the distance from the bottom wall to the top wall, and a spring element located on the bottom wall for pressing the case towards the top wall, the relationship between the dimensions of the case and the dimensions of the storage box being such that the case can be slid under the top wall to a position between the side walls of said first pair against the bias of the spring element, said spring element biasing the case towards the side walls of said first pair and upwards against the top wall to maintain the case in a safe storage position in the storage box.

Preferably, the storage box is made of plastics material by injection moulding and the spring element is formed by a steel blade spring mounted to the bottom of the storage box by press fitting.

It is also preferred that the storage box is designed for receiving several cases, partition walls being arranged between the locations for the several cases and one spring element being provided for each case to be received in the storage box.

The accompanying drawings which are incorporated in and constitute a part of this specification, illustrate embodiments of the invention and together with the description serve to explain the principles of the invention.

Figure 1:
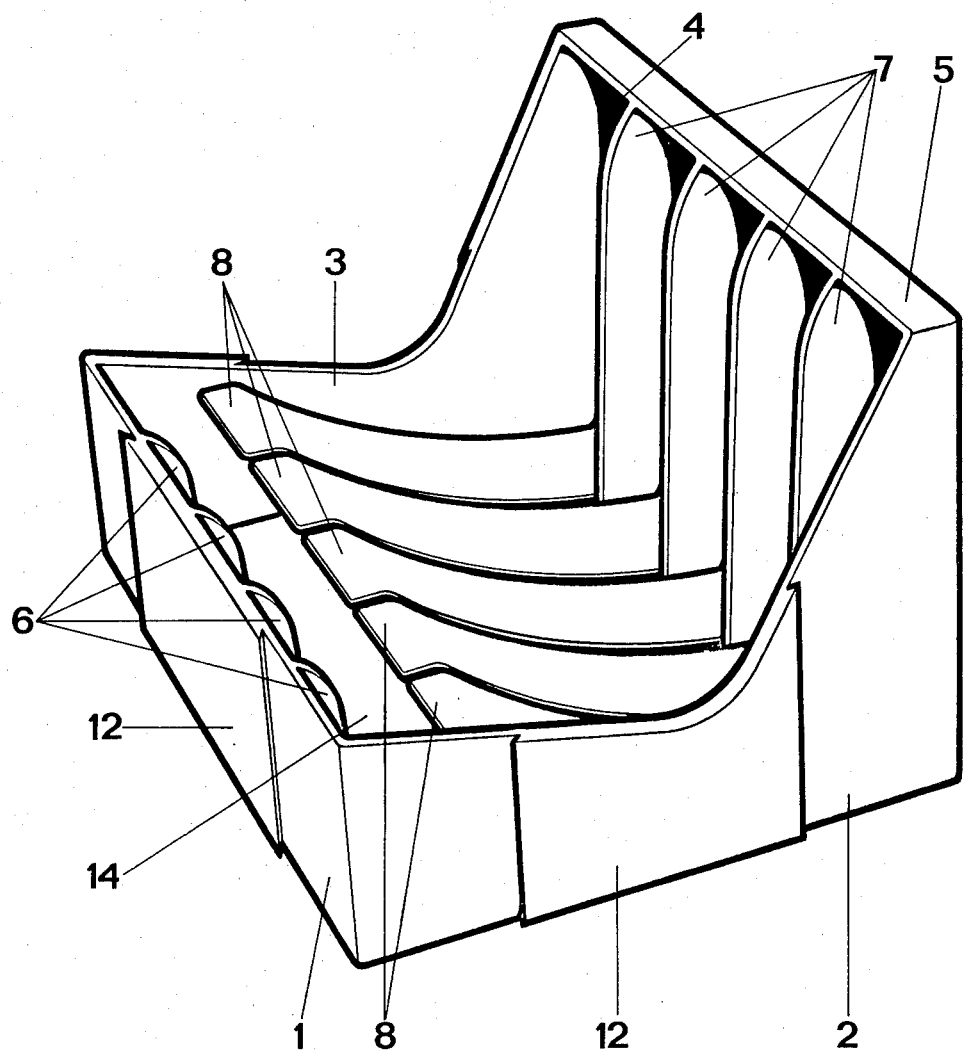
FIG. 1 is a perspective view of a storage box for storing five cases.

Reference will now be made in detail to the present preferred embodiments of the invention, examples of which are illustrated in the accompanying drawings.

Referring to the drawings, the storage box shown therein comprises a front wall 1, side walls 2 and 3, a back wall 4, and a bottom wall 14. Each of these walls is perpendicular to adjoining walls. Along the upper edge of the back wall 4 there is provided a top wall 5 which is perpendicular to the back wall 4 and also to the side walls 2 and 3 and extends inwardly over the bottom wall 14. A number of partition walls 7 extend between the bottom wall 14 and the top wall 5 along the back wall 4. Partition walls 7 are integral with walls 4, 5 and 14 and are parallel to each other and to the side walls 2 and 3. Accordingly, they are perpendicular to the back wall 4. The distance between adjacent partition walls 7 is as large as the distance between the outermost partition wall and the adjacent side wall 2 and 3, respectively. The partition walls are arranged to form side supports for cases received by the storage box and to space such cases from each other. For this purpose an equal number of partition walls 6 are provided on the front wall 1, said walls 6 being in register with the partition walls 7. The partition walls 6 are integral with the front wall 1 and join the bottom wall 14 at their lower ends. The partition walls 6 and 7 are curved at their upper ends in order to facilitate the insertion of the cases into the storage box.

For the interconnection of two or more storage boxes there are provided dove tail connection portions 12 and 13. The projecting portion 12 of one storage box can be engaged with the groove portion 13 of an adjacent storage box.

A number of parallel metal blade springs 8 of equal length are provided in the storage box. These springs 8 are integral at one end thereof with a web 8' which accordingly joins the blade springs together. The purpose of the springs is to retain the cases in the storage position and also to displace the cases upwards when they are being removed from the storage box.

Figure 2:
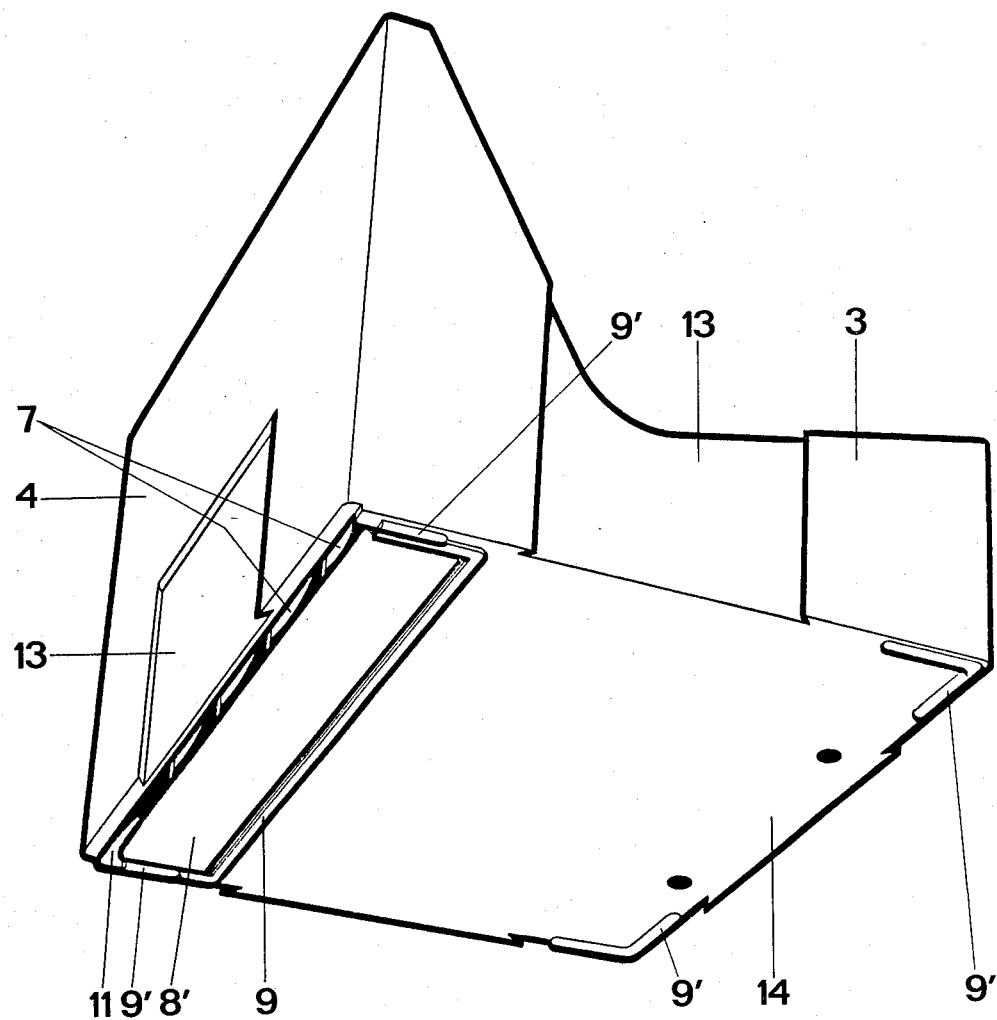
FIG. 2 is a perspective view of the storage box in FIG. 1 as seen from below.

FIG. 2 shows the storage box in perspective view from below and it is seen therein that four supporting feet 9' and a rib 9 are provided on the lower side of the bottom wall 14. The rib 9 is adapted to form an abutment for the web 8' in order to retain the web and thus the blade springs integral therewith in the intended position shown in the drawings.

Figure 4:
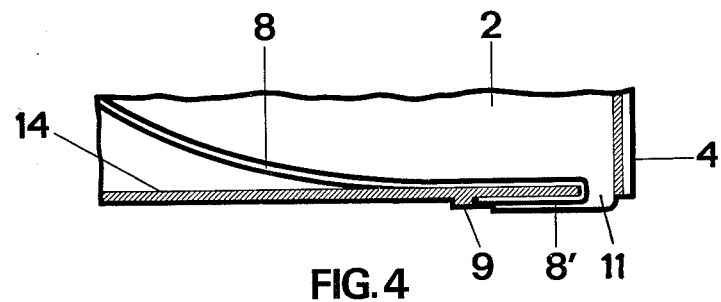
FIG. 4 is a fragmentary cross-sectional view of the storage box at the bottom region thereof, showing the attachment of the springs to the bottom.

When the springs 8 are to be mounted to the storage box they are passed through an opening 11 in the bottom wall 14. The springs which form an angle of 180° to the web 8', extending from one edge of the web as seen in FIG. 4, are located to partly embrace the bottom wall 14 together with the web as is also seen in FIG. 4. The web 8' which is located under the bottom wall and inside the rib 9 has a width which is substantially greater than the width of the opening 11. Accordingly, the springs 8 are prevented from sliding off the bottom wall 14 by the web 8' abutting the back wall 4, and thus the springs are securely maintained in their intended position in the storage box.

The free end of each spring 8 is spaced from the bottom wall 14 when the spring is unloaded, as will be seen in FIG. 1. The springs 8 have a curvature as seen in FIG. 1, which is particularly favourable when a case is to be inserted into the storage box because the case more easily pivots towards the inner surface of the back wall 4 when the lower surface of the case engages the curved portion of the spring 8.

Figure 3:
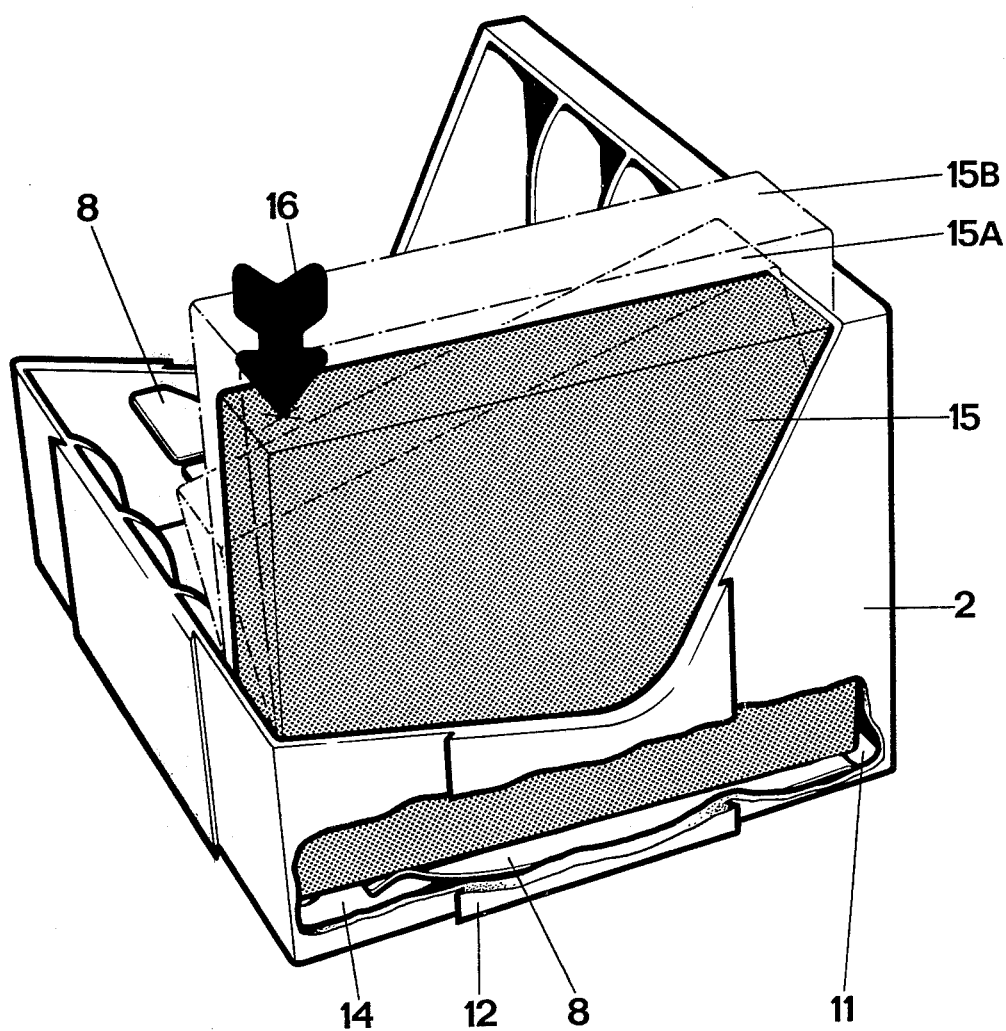
FIG. 3 is a perspective view of the storage box with cases shown in different positions therein.

The dimensions of the storage box and particularly the height of the front wall 1, the inside distance between the top wall 5 and the bottom wall 14 as well as the inside distance between the front wall 1 and the back wall 4 are adjusted to the dimensions of the type of case which is to be stored in the storage box. In FIG. 3 there is shown a parallelepipedic case 15 in the stored position. The case can be brought to the stored position shown by applying a pressure, e.g. by a finger, to the upper surface of the case 15, viz. at a position which is located near the right-hand corner of the case in FIG. 3. The inside distance between the upper edge of the front wall 1 and the inner edge of the top wall 5 as well as the inside distance between the front wall 1 and the back wall 4 are adjusted to the size of the case in such a manner that the case can slide into the storage box to the position shown.

When the case 15 is inserted into the storage box, the spring 8 will be depressed against the spring bias due to the fact that the free end of the spring is engaged by the lower side of the case 15. The point of engagement between the spring 8 and the lower side of the case 15 is displaced from the centre of the lower side of the case towards the left-hand corner.

The inside distance between the top wall 5 and the bottom wall 14 should be somewhat greater than the length of the short side of the case 15 in order to allow the upper right-hand corner of the case to slide under the top wall 5.

The front wall 1 has a height which is substantially smaller than the height of the back wall 4, the height of the front wall 1 being only about half the height of the back wall 4.

When the case 15 is being pressed down, the back side thereof slides along the inner edge of the top wall 5, and when the right-hand corner comes below the top wall 5 the case is moved under the top wall towards the inner surface of the back wall 4 due to the form and tension of the spring 8 and also due to the pressure applied by the finger. When the finger is removed, the spring 8 will press the case upwards, the right-hand corner of the case sliding along the inner surface of the back wall 4 until the upper surface of the case 15 engages the lower side of the top wall 5. Simultaneously, the lower left-hand corner of the case will be pressed upwards against the inner surface of the front wall 1. This upward movement of the case eventually ceases because the distance from the inner corner formed between the back wall 4 and the top wall 5, to the upper edge of the front wall 1 is made less than the diagonal of the case. In the position attained by the case 15 in FIG. 3, the case thus cannot disengage the storage box even if the storage box is turned up and down because the weight of the case 15 will add to the pressure applied to the case by the spring 8. The pressure applied by the spring must be so great that it can overcome the weight of the case 15 when the storage box is in the intended position shown in the drawings.

In FIG. 3 there is also illustrated how to proceed when it is desired to remove a case from the storage box. The arrow 16 indicates the pressure applied by a finger at a place on the upper surface of the case 15, which is located near the left-hand corner thereof. When the case is pressed down in this way, it will pivot towards the front wall 1, the upper right-hand corner sliding along the lower side of the top wall 5 and eventually disengaging the top wall at the inner edge thereof. During this operation, the spring 8 will be further tensioned and when the upper right-hand corner disengages the top wall 5 the case will be displaced upwards to the position indicated by dash and dot lines 15A.

In FIG. 3 it is also shown that the case will attain an upper position indicated by dash and dot lines 15B when the finger has been removed from the case and the case accordingly can be moved further upwards by the spring 8. In this position there is equilibrium between the weight of the case 15 and the bias of the spring 8 and the case can then easily be removed by hand from the storage box.

It will be apparent to those skilled in the art that various other modifications and variations in addition to those mentioned above could be made in the storage box of the invention without departing from the scope and spirit of the invention.

We claim:

1. Storage box for substantially parallelepipedic tape and film cases, said storage box comprising a pair of parallel side walls, a front wall and a back wall parallel to each other and perpendicular to said side walls, said front and back walls being spaced apart a distance greater than the front and back walls of said case to be positioned therein, a bottom wall, a top wall spaced from the bottom wall and extending inwardly a short distance from said back wall and perpendicular thereto, said bottom wall and said top wall being arranged to receive the case therebetween, the front wall having a height from the bottom wall which is substantially half the distance from the bottom wall to the top wall, and a spring element located on the bottom wall for pressing the case towards the top wall, said spring element engaging said bottom wall adjacent said back wall and extending along a curved line toward said front wall, said spring element having a free end adjacent said front wall and spaced from said bottom wall, the relationship between the dimensions of the case and the dimensions of the storage box being such that the case can be slid under the top wall to a position between the side walls against the bias of the spring element, said spring element pivoting and biasing the case against both the front and back walls and upwards against the top wall to maintain the case in a safe storage position in the storage box, said case being removable from said storage box by applying downward pressure only on said case at a position adjacent said front wall and toward said bottom wall, whereby said free end of said spring element is moved toward said bottom wall and said case pivots toward said front wall and away from said back wall, whereby said case disengages from said top wall.

2. Storage box as claimed in claim 1 further comprising a number of partition walls extending along the inner surface of the front wall and the back wall in parallel with each other, the partition walls along the front wall being spaced from and registering with the partition walls along the back wall.

3. Storage box as claimed in claim 2 wherein the partition walls extending along the back wall join the top wall at their upper ends.

4. Storage box as claimed in claim 2 wherein the partition walls join the bottom wall at their lower ends.

5. Storage box as claimed in claim 1 wherein the spring element comprises a blade spring.

6. Storage box as claimed in claim 5 wherein a plurality of blade springs are integral with a web forming means for connecting said blade springs to the bottom wall of the storage box.

* * * * *